May 12, 1925.
B. C. SKINNER
DRYING APPARATUS
Filed June 14, 1922
1,537,625
2 Sheets-Sheet 1
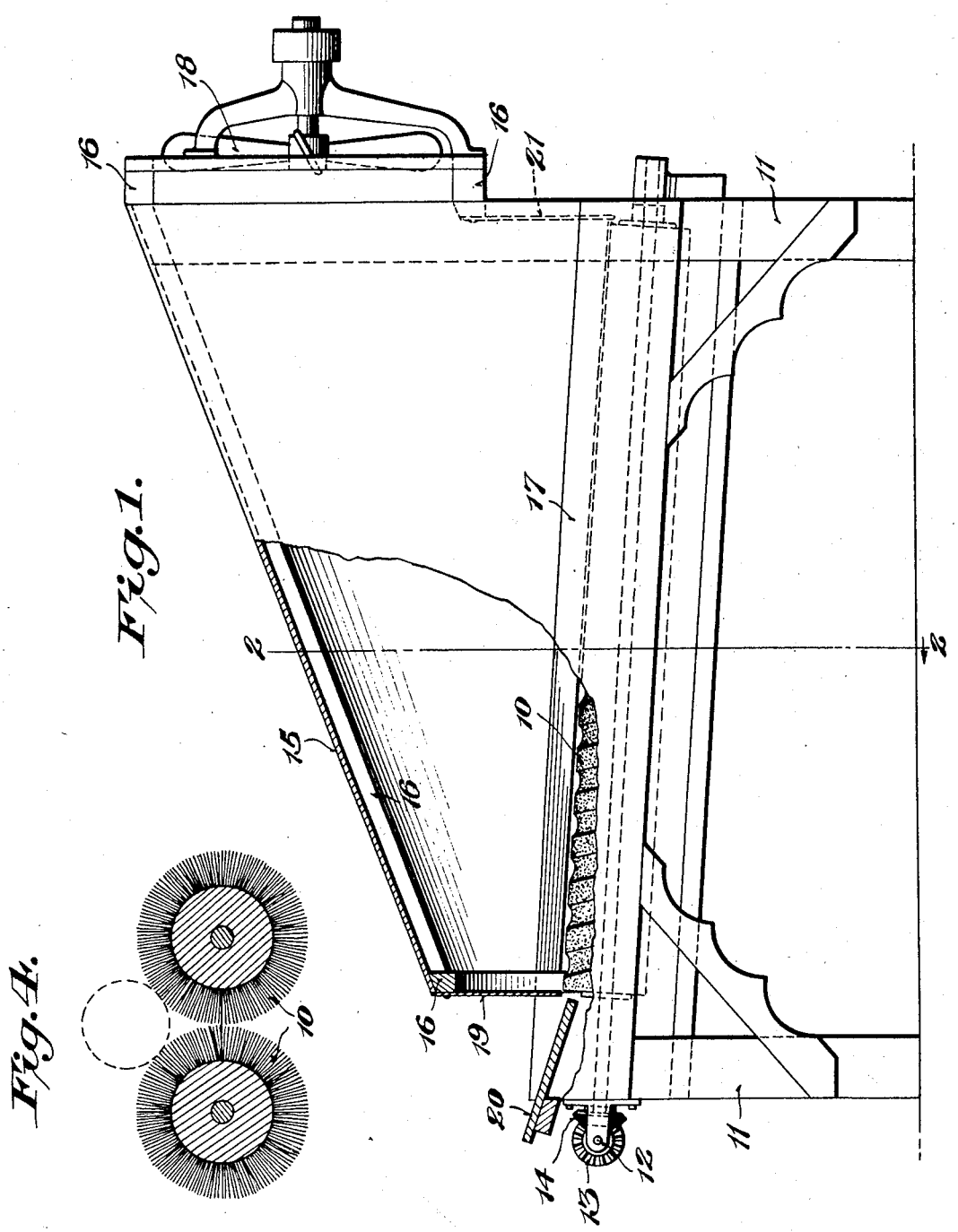
Inventor
Bronson C. Skinner,
By Steward & McKay
his Attorneys
WITNESS:-
Chas. L. Griesbauer May 12, 1925.  1,537,625
B. C. SKINNER
DRYING APPARATUS
Filed June 14, 1922  2 Sheets-Sheet 2
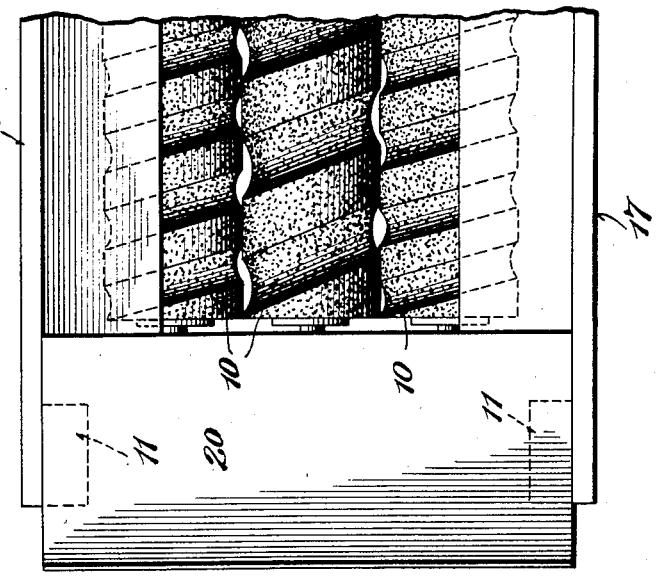
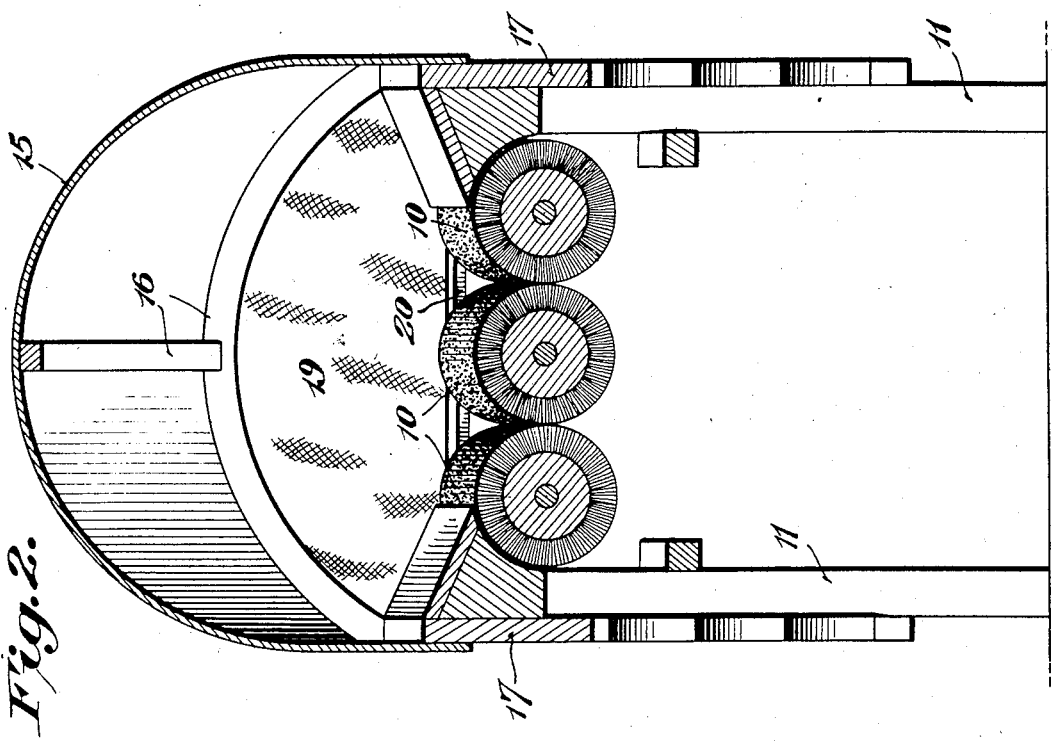
Inventor
Bronson C. Skinner,
By Steward & McKay
his Attorneys
WITNESS:-

Patented May 12, 1925.

1,537,625

UNITED STATES PATENT OFFICE.

BRONSON C. SKINNER, OF DUNEDIN, FLORIDA, ASSIGNOR TO SKINNER MACHINERY COMPANY, OF DUNEDIN, FLORIDA, A CORPORATION OF FLORIDA.

DRYING APPARATUS.

Application filed June 14, 1922. Serial No. 568,351.

*To all whom it may concern:*

Be it known that I, BRONSON C. SKINNER, a citizen of the United States, residing at Dunedin, county of Pinellas, State of Florida, have invented certain new and useful Improvements in Drying Apparatus; and I do hereby declare the following to be a full, clear, and exact description of the invention, such as will enable others skilled in the art to which it appertains to make and use the same.

My invention relates to drying apparatus; and it relates more particularly to apparatus for drying articles of a generally globular shape.

The novel apparatus, although of general applicability, as stated, to the drying of articles of a generally globular shape, is especially useful in the treatment of fresh citrus fruit such as oranges, tangerines, grapefruit and lemons, as well as other fruits such as apples, in the preparation of the same for market. As such specific use of the apparatus in the treatment of fruit clearly illustrates the broad fundamental principles involved in the invention, reference will be made in the illustrative embodiment of the invention hereinafter described more particularly to the treatment of fruit, and especially citrus fruit.

In a customary method of preparing citrus fruit for the market, the freshly picked fruit first undergoes a thorough cleansing to remove all foreign matter from the skin thereof, generally by soaking in a vat of water and then passing the fruit through scrubbing apparatus where the fruit is subjected to the action of brushes in association with a water spray. From the cleansing operations, the fruit is delivered to a drier and thereafter to a polishing apparatus designed to impart by a rubbing or brushing action as high a polish as possible to the fruit so as to enhance its appearance and saleability.

Thorough drying of the fruit is of extreme importance in its effect not only upon the subsequent polishing operation but also upon the ultimate condition of the fruit when ready for marketing. If there has not been a substantially complete removal of the surface moisture, a satisfactory polish upon the skin of the fruit is difficult if not impossible to attain. Also, such substantial removal of the surface moisture is essential to avoid the development of mold of fungi discoloring the fruit or causing its decay.

Because of the importance of this drying operation, considerable attention has been paid thereto. The most effective types of drying apparatus which have been developed heretofore, however, require a large amount of valuable floor space and are relatively complicated and expensive. Generally speaking, they employ large drying chambers and endless carriers for supporting and feeding the fruit therethrough. Generally also, a current of a fluid drying medium such as air is directed against the fruit and means are provided for constantly turning the fruit upon its support to expose successive areas of its surface to this current. One common form of such endless carrier employs rollers for both supporting and turning the fruit, and while ultimately the turning movements imparted to the fruit cause exposure of successive areas about its entire surface, the turning movements are comparatively slow and a substantial time for such exposures is required and especially for the many complete exposures needed to thoroughly dry the fruit.

One of the objects of my invention is the attainment of quicker drying by imparting relatively rapid turning movements to the fruit or the like about everchanging axes thereof, constituting in substantial effect spinning movements about changing axes, such spinning movements being advantageously sufficiently rapid to aid by centrifugal action in removing surface moisture.

Another object of my invention is to thus turn or spin the fruit upon such a supporting surface and with the fluid drying medium so directed that the drying currents may simultaneously reach substantially all portions of the fruit and desirably also all portions of the supporting surface.

A further object of the invention is the provision of an apparatus to carry out these objects, of simple compact form, requiring a minimum amount of floor space, and relatively inexpensive to manufacture.

Still another object of my invention is to provide simultaneously with the application of a drying current, a brushing action upon the fruit effective in promoting the drying operation, and preferably sufficiently prolonged to produce a polish upon the fruit.

Such associated operations produce extremely satisfactory results in the preparation of the fruit for market.

My novel apparatus may be used with extremely good effect either as the sole drier unit of the installation or as an additional unit supplemental to the customary drier unit now used in the usual packing house installations.

As already stated, the novel apparatus contemplates a brushing action upon the fruit not only effective in promoting the drying operation but preferably prolonged into a polishing operation. The novel apparatus may, therefore, be used not only as a drier but as a polisher, and, if desired, may entirely take the place of the customary polisher unit. Or it may be used as a unit supplemental to and preceding the customary polisher, and in such use is particularly effective in preparing the fruit for a final polishing operation.

The objects and principles of my invention will be best understood from the description hereinafter given of an illustrative embodiment of the novel apparatus in a preferred form. It is to be understood, however, that the embodiment hereinafter given is merely illustrative and that within the broad scope of the invention are included other specific constructions in accordance with the principles here involved, and as defined in the appended claims.

Referring to the drawings,

Figure 1 is a side elevation, with certain parts broken away, of apparatus contsructed in accordance with my invention;

Fig. 2 is a transverse section thereof on the line 2—2 of Fig. 1 looking in the direction of the arrows;

Fig. 3 is a partial plan view of the front or receiving end of the apparatus with the hood shown in Fig. 1 removed;

Fig. 4 is a sectional view diagrammatic in character, on an enlarged scale through two adjacent brush rolls and showing a fruit, such as an orange or a grapefruit, supported upon the brush surfaces.

In the illustrative embodiment of my novel apparatus, a series of parallel rotating brush rolls, each roll cooperating with an adjacent roll of the series to form a runway for the fruit, are provided as the means for supporting and feeding the fruit through the region of the drying operation, and currents of air, as the fluid drying medium, are forcibly directed upon the fruit traversing the runways and along the brush surfaces. I have found that when fruit, and particularly fruit of globular shape such as the citrus fruit hereinbefore mentioned, is thus supported upon the two juxtaposed pervious cylindrical surfaces of bristle brush rolls, substantial access to all portions of the surface of that fruit simultaneously may be had by a drying current directed across the fruit and along the brush surfaces. The fruit is supported substantially upon the ends or tips of the radially extending and more or less spaced bristles or hairs of the brushes, through which spaces the drying current penetrates both to dry the brush and the fruit passing thereover. Fig. 4 diagrammatically illustrates how the fruit is supported upon the brushes, rendering possible such passage of the drying current through the brushes and over the entire surface of the fruit at once.

The precise construction of the brushes may vary according to the character or degree of rubbing action desired upon the fruit. Where a fairly vigorous rubbing action is desired and not a polishing action, the brushes may be provided with bristles of medium stiffness. Where a polishing action is desired in addition to that rubbing or brushing which promotes the drying of the fruit, bristles of a finer and softer quality and greater flexibility may be employed. Or if desired, the rolls may each be provided with two or more brushes of these differing characteristics, the coarser and stiffer brushes disposed at the receiving end of the apparatus and over a sufficient extent of the rolls to substantially complete the drying operation and the polishing brushes disposed therefrom toward the delivery end of the apparatus.

In the construction chosen to illustrate the principles of the invention, the brushing mechanism is of the inclined parallel brush-roll type of which the well-known Stebler-Parker polisher is a typical example. In the present instance, the inclined parallel brush-rolls of this general type of polisher are indicated generally at 10. These rotary brush-rolls may be of the usual type in which the brushing surfaces are constituted by horsehair bristles. A plurality of such rolls may be provided, three being shown by way of example mounted in the framework 11, cooperating in pairs to provide between the rolls of each pair a runway for fruit, and the rolls being inclined to provide runways sloping gently from the upper or receiving end of the polisher to the lower or discharge end. This brush rolls are suitably journaled at their ends in the framework 11, and are driven at the proper speed in the same direction of rotation by any suitable driving mechanism, such for example as a common drive shaft extending transversely of the ends of the brush roll spindles and with bevel gears thereon cooperating with bevel gears on the brush-roll spindles. Such a driving mechanism is partially shown in Fig. 1, the common drive shaft being indicated by the numeral 12 and one pair of cooperating bevel gears by the numerals 13 and 14.

The slope of the brush rolls together with their rotative movement may be relied upon to advance the fruit through the apparatus; or the brushes may be spirally cut or ground to positively feed the fruit and at a rate determined by the pitch of the spiral and the speed of rotation of these rolls. In the illustrative apparatus, as shown in Figs. 1 and 3, spirally cut brushes are employed. Preferably also, and as shown in Fig. 3, any two adjacent rolls of the series have their brush surfaces relatively cut upon differential spirals, the result being to constantly vary the axis of the rotative movements imparted to the fruit, and hence to subject progressively varying areas of the surface of the fruit not only to the brushing action of the rolls but to the current of the drying medium. Where the series consists of three brush-rolls, as shown in Fig. 3, the intermediate brush roll is cut upon a spiral of different pitch from that of the two outer brush rolls.

As hereinbefore stated, in the illustrative apparatus air is employed as the drying medium. While my novel apparatus, considered in its broader aspects, may embody means providing an induced air current, I have found that a positive air blast forced directly against the fruit and supporting brush surfaces is far more effective in securing a thorough drying effect rapidly, and means providing a positive air blast is therefore much to be preferred. The novel apparatus here shown therefore includes positive air blast means. A casing or hood 15, supported by a suitable framework 16 is mounted immediately over the series of brush rolls. Preferably the air is blown in an inclined direction downwardly upon the fruit and brush rolls and in counter-current to the advancing movement of the fruit. Accordingly, the hood is formed with side walls extending along and in contact with the side frame 17 of the apparatus and hence of a uniform width to transversely cover the brush rolls, but with its upper wall, desirably dome-shaped as shown, downwardly inclined from its intake, which is adjacent the delivery end of the brush rolls, to a point adjacent the receiving end of the rolls where the fruit is fed into the apparatus.

Any suitable device may be employed for blowing the air through the hood and into contact with the fruit and brush surfaces. The air may be heated or subjected to a preliminary drying process, if desired. In the illustrative apparatus, a blower-fan 18 is mounted in the framework 16 at the intake end of the hood in position to force a current of air through the hood into contact with the fruit as it advances down the polisher runways. A curtain or flap 19 of canvas or other suitable flexible material guards the entrance to the hood and to the upper end of the roll mechanism. This prevents substantial escape of the air from the hood at this point and assists in deflecting the air downwardly upon the fruit and brush rolls. The curtain 19 is so hung, however, as to permit the passage of fruit thereunder by flexure of its depending lower portion as the fruit advances over the chute board 20. A similar curtain or flap 21 is hung over the otherwise open exit from the hood adjacent the lower or delivery end of the brush rolls. It will be seen that by reason of the arrangement described, the drying blast of air passes more or less in counter-current to the travel of the fruit.

The fruit delivered to the chute board or hopper 20, rolls by gravity beneath the curtain 19 and on to the brush runways, along which it is advanced within and through the hood, and out of the apparatus beneath the curtain 21.

The brush-rolls preferably are rotated at a sufficient speed to rapidly turn or spin the fruit thereon. The fruit is fed to the upper or receiving ends of the runways in the manner hereinbefore stated, and the rapid rotation of the brush-rolls, with their differentially cut brush-surfaces, not only advances the fruit along the runways but imparts a rapid turning or spinning movement thereto about constantly changing axes. If the fruit is delivered from the washers direct to this drier, and therefore with an appreciable amount of water clinging to the surface, the rapid spinning movement greatly assists the drying by throwing off liquid particles by centrifugal action. And finally, the constant turning of the fruit in all directions in this spinning movement exposes all areas of the surface repeatedly to the direct force of the air blast. In addition to this direct contact of the air blast with the uppermost surface of the fruit, the oblique and downward direction of that blast causes fine currents of air to penetrate the brushes in all parts contiguous to the fruit supported thereon, thus taking up the moisture which may have been absorbed by the brushes from the fruit, and drying not only the under surface of the fruit but the brushes constituting the supporting surfaces.

In the illustrative apparatus, by the time the fruit has reached the delivery end of the apparatus, not only has the drying operation been effectively accomplished, but a substantial polish has been imparted to the fruit.

What I claim is:

1. Fruit treating apparatus comprising the combination, with means including a rotary brush roll arranged to provide a fruit runway, of means for delivering fruit to said runway, and means for directing a current of a fluid drying medium along said runway counter to the advancing fruit.

2. Fruit treating apparatus comprising the combination, with parallel sloping revoluble brush rolls arranged in pairs cooperating to provide fruit runways, means for delivering fruit to said runways, and means for forcing a current of a fluid drying medium along said runways counter current to the advancing fruit.

3. Fruit treating apparatus comprising the combination, with parallel rotary brush-rolls arranged in pairs cooperating to provide fruit runways, means for delivering fruit to said runways, a hood over said brush-rolls and a fan positioned therein for producing a current of air therethrough.

4. Apparatus for treating fruit comprising the combination, with a plurality of rotary brush-rolls mounted in parallel to provide one or more fruit runways, of means for producing and directing a blast of a fluid drying medium obliquely downward upon said runways and in a general direction counter to the advancing movement of the fruit along said runways.

5. Apparatus for treating fruit comprising the combination, with a plurality of rotary brush-rolls mounted in parallel to provide one or more fruit runways, said brush rolls being spirally cut to advance said fruit along said runways, and means for directing a blast of a fluid drying medium in counter-current to and against said advancing fruit.

In testimony whereof I hereunto affix my signature.

BRONSON C. SKINNER.